Oct. 26, 1965 W. R. ROOS 3,214,126
OUTLET BOX SUPPORT
Filed Nov. 2, 1962 2 Sheets-Sheet 1
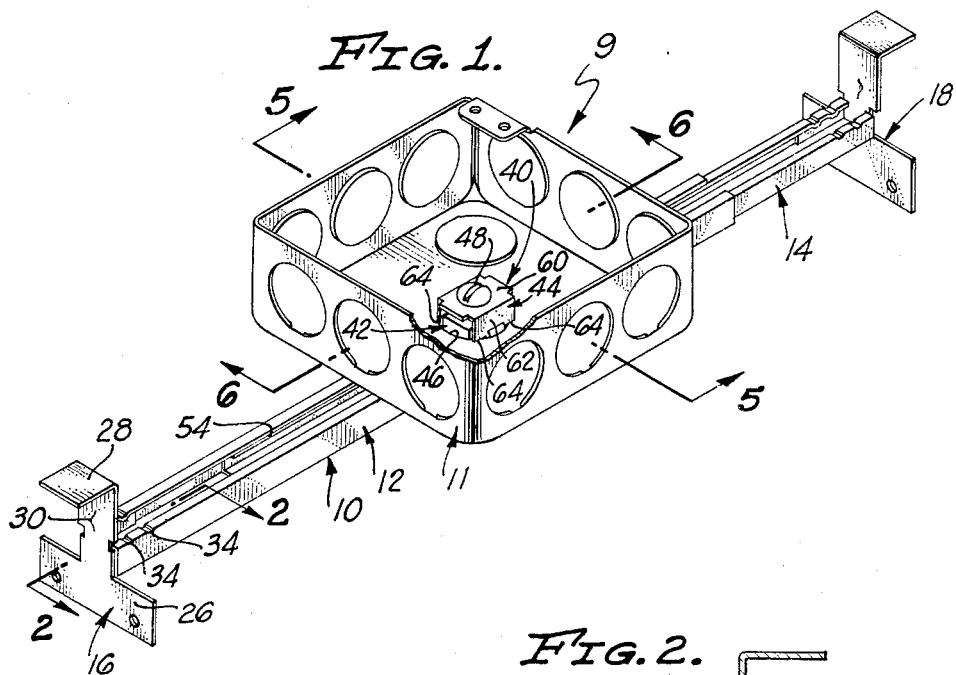
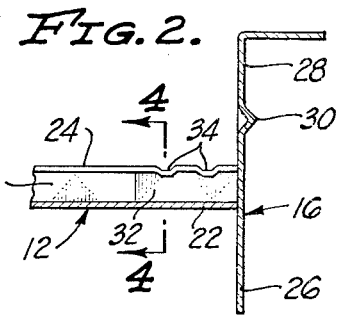
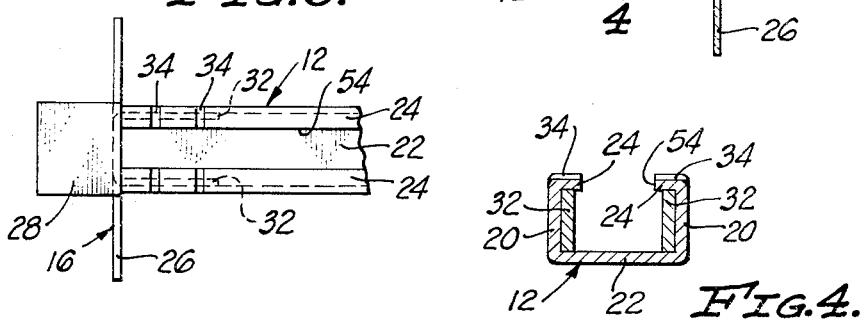
INVENTOR.
WILLIAM R. ROOS
BY HIS ATTORNEYS
HARRIS, KIECH, RUSSELL & KERN Oct. 26, 1965   W. R. ROOS   3,214,126
OUTLET BOX SUPPORT
Filed Nov. 2, 1962   2 Sheets-Sheet 2
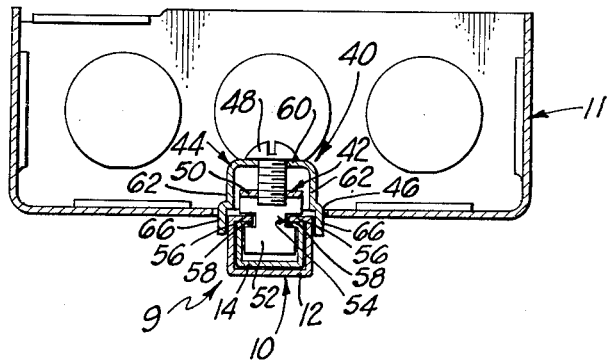
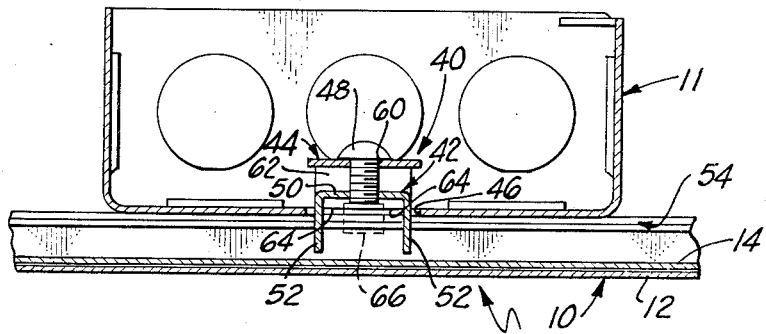
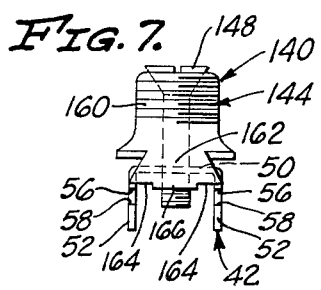
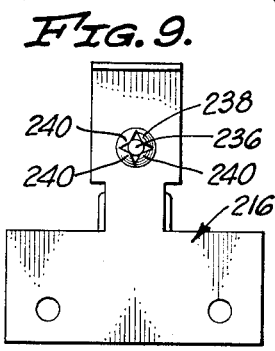
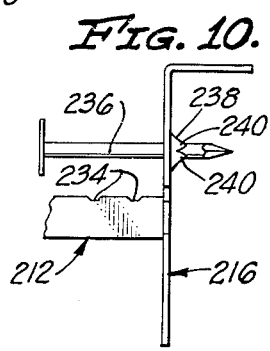
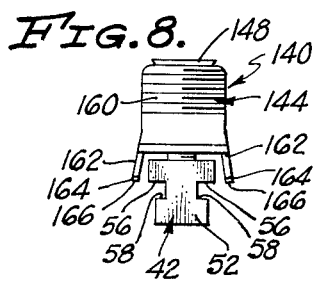
INVENTOR.
WILLIAM R. ROOS
BY HIS ATTORNEYS
HARRIS, KIECH, RUSSELL & KERN

United States Patent Office

3,214,126
Patented Oct. 26, 1965

1

3,214,126
OUTLET BOX SUPPORT
William R. Roos, El Monte, Calif., assignor to Bowers Manufacturing Company, Inc., Los Angeles, Calif., a corporation of California
Filed Nov. 2, 1962, Ser. No. 235,007
6 Claims. (Cl. 248—318)

The present invention relates in general to a support for such electrical fixtures as outlet boxes, junction boxes, or the like.

More particularly, the invention relates to, and primary objects thereof are to provide, improved connections between a hanger bar and mounting members at the ends thereof, and between a hanger bar and an outlet box, or the like.

Normally, a hanger bar of the type to which the invention relates includes two bar members which are telescopically interconnected so as to render the hanger bar adjustable as to length to accommodate variations in stud spacing, joist spacings, and the like. Each bar member is provided at one end with a mounting member, such mounting member being formed integrally with the bar member in some instances, but more commonly being a separate piece to which the bar member is secured. In one prior construction, each bar member and its mounting member are brought into abutting relation and are butt welded together. This construction is relatively expensive and is not completely reliable since failures occasionally occur in the weld or welds between the bar members and their mounting members, which is obviously undesirable.

A basic object of the invention is to provide a connection between each bar member and its mounting member which is stronger and less expensive than a butt welded connection, and one which is virtually failure proof.

More particularly, an important object of the invention is to provide a construction wherein each mounting member is connected to an end of the corresponding bar member by swaging together such bar member end and a telescopically related connector element on the mounting member.

Still more particularly, an object of the invention is to provide a swaged connection wherein the mounting member has two laterally spaced connection elements telescoped longitudinally into an end of the corresponding bar member, and wherein such end of the bar member is swaged onto the connector elements.

Another, and even more specific, object of the invention is to provide a hanger bar construction which includes: a channel-shaped bar member having laterally spaced side walls, an integral connecting wall joining the side walls of the bar member, and inturned flanges integral with and projecting inwardly from the side walls of the bar member and spaced from the connecting wall thereof; a mounting member having two laterally spaced connector tabs inserted into the bar member respectively adjacent the side walls thereof and respectively between the inturned flanges and the connecting wall of the bar member; and a swaged connection between the mounting member and the bar member wherein portions of the inturned flanges of the bar member are swaged into the adjacent edges of the connection tabs on the mounting member.

With the foregoing construction, a strong, rigid connection between each mounting member and the corresponding bar member end is achieved quite inexpensively. This swaged connection of the invention has excellent resistance to bending, shear and torsional stresses resulting from the weight of an outlet box, or the like, supported by the hanger bar, and also has good resistance

2 to tension stresses tending to longitudinally separate the bar and mounting members. Further, even if the swaged connection between the connector tabs on each mounting member and the corresponding bar member end are not absolutely perfect, or become loose, the hanger bar of the invention will still perform its intended function because of the telescopic relation between the connector tabs and the corresponding bar members.

Another basic object of the invention is to provide a device for quickly and reliably mounting an outlet box, or the like, on a hanger bar which is generally channel-shaped and which has laterally spaced, inturned flanges defining a longitudinal slot therebetween.

More particularly, an important object of the invention is to provide a mounting device which includes: a U-shaped box locator having arms extending into the hanger bar; a generally U-shaped clamping clip oriented crosswise of the box locator and having arms provided with end surfaces engageable with an outlet box, or the like, adjacent an opening therein to clamp the outlet box against the hanger bar; and a clamping screw extending through the base of the generally U-shaped clamping clip and threaded into the base of the U-shaped box locator.

Another object of the invention is to provide a U-shaped box locator having a base externally of the hanger bar and having arms which extend through the longitudinal slot in the hanger bar into the interior thereof.

A further object is to provide a box locator having arms provided in their edges with notches to receive the inturned flanges of the hanger bar, such notches providing shoulders engageable with the inner surfaces of the inturned flanges.

Still another object is to provide a generally U-shaped clamping clip, oriented crosswise and straddling the box locator, having arms provided with end surfaces engageable with the inner surface of the box adjacent an opening therein and provided with central tabs insertable into and engageable with the edge of the opening. With this construction, the central tabs on the clamping-clip arms provide a quick and positive means of accurately locating the clamping clip relative to the opening in the box.

Yet another object is to provide a clamping clip wherein the central tabs on the arms thereof are of sufficient length to engage the outer surfaces of the side walls of the hanger bar in straddling relation, thereby quickly and positively locating the clamping clip relative to the opening in the outlet box, and simultaneously quickly and positively locating the outlet box properly relative to the hanger bar.

The foregoing objects, advantages, features and results of the present invention, together with various other objects, advantages, features and results thereof which will be evident to those skilled in the box support art in the light of this disclosure, may be achieved with the exemplary embodiment of the invention described in detail hereinafter and illustrated in the accompanying drawings, in which:

FIG. 1 is a perspective view of an outlet box support of the invention which includes a hanger bar thereof;

FIG. 2 is an enlarged, fragmentary sectional view of one end of the hanger bar of FIG. 1 and is taken along the arrowed line 2—2 of FIG. 1;

FIG. 3 is a further enlarged view looking downwardly on the end portion of the hanger bar which is shown in FIG. 2;

FIG. 4 is a still further enlarged sectional view taken along the arrowed line 4—4 of FIG. 2;

FIGS. 5 and 6 are sectional views repectively taken along the arrowed lines 5—5 and 6—6 of FIG. 1, and illustrate one embodiment of a device of the invention for mounting an outlet box, or the like, on a hanger bar;

FIG. 7 is a side elevational view of anther device of the invention for mounting an outlet box, or the like, on a hanger bar;

FIG. 8 is an end elevational view of the mounting device of FIG. 7;

FIG. 9 is an end elevational view of another hanger bar of the invention; and

FIG. 10 is a fragmentary side elevational view showing one end of the hanger bar illustrated in FIG. 9.

In the drawings, the box support of the invention is designated generally by the numeral 9 and includes a hanger bar 10 carrying a box 11, e.g., an outlet box. The hanger bar 10 is made adjustable as to length to accommodate different stud spacings, joist spacings, and the like, and thus includes two telescopically interconnected bar members 12 and 14. The bar member 12 is larger than the bar member 14 so that the former receives the latter therein in telescopic relationship.

Connected to the bar members 12 and 14 in accordance with the invention are mounting members 16 and 18, respectively, nailable, or otherwise securable, to adjacent studs, joists, or the like, as is conventional. Except for size differences, the bar member 14 and the mounting member 18 are identical to the bar member 12 and the mounting member 16, respectively, and are interconnected in accordance with the invention in an identical manner. Consequently, only the bar member 12, the mounting member 16, and the interconnection therebetween, will be considered in detail herein.

The bar member 12 is generally channel shaped in cross section and includes two laterally spaced side walls 20 integrally joined by a connecting wall 22. The side walls 20 are provided with inturned flanges or lips 24 which project inwardly from the respective side walls 20 and which are spaced from and parallel to the connecting wall 22.

The corresponding mounting member 16 is made from sheet metal with selected portions deformed from a blank. It is provided with a flange 26 in the plane of the blank by means of which it may be nailed, or otherwise secured, to a stud, joist, or the like. The mounting member 16 also includes an L-shaped flange 28 formed by a tongue of the blank bent to lie at a right angle thereto, this flange 28 being adapted to be hooked over the front surface of a stud or the edge of a ceiling joist, for example, to properly locate the hanger bar 10 relative to such stud or joist. The L-shaped flange 28 is provided with a dimple 30 adapted to be driven into the adjacent side of the stud, or the like, to help key the mounting member 16 in place.

Considering now the interconnection of the invention between the bar member 12 and the mounting member 16, the latter is provided with two integral, transversely spaced connector tabs 32 which extend into the corresponding end of the bar member 12. More particularly, the connector tabs 32 respectively lie adjacent and parallel to the side walls 20 of the bar member 12 and respectively fit closely between the inturned flanges 24 and the connecting wall 22 thereof. Each tab is deformed from the blank at a position adjacent the inner edge of the corresponding flange 26, being sheared therefrom in the process of being deformed to extend at a right angle relative to the material of the blank.

To secure the bar member 12 and the mounting member 16 together, the inturned flanges 24 are indented or swaged into the adjacent edges of the connector tabs 32. While one swage point along each flange may be employed I prefer to employ two or more swage points spaced from each other along the edge of each tab 32. Each such swaged indentation is designated by the numeral 34. The swaged indentations can alternatively or additionally be formed in the connecting wall 22 to lock with the opposite edge of the tab 32 but this construction is less desirable and need not be used to supplement the attachment afforded by the swaged indentations 34 illustrated.

The foregoing construction provides a positive and rigid interlock between the bar member 12 and the mounting member 16 capable of being achieved readily and inexpensively. This interlock resists longitudinal separation of the bar member 12 and the mounting member 16 due to any tension stresses acting longitudinally of the bar member. The swaged interconnection, coupled with the telescopic relation between the connector tabs 32 and the bar member 12, provides substantial strength with respect to bending stresses, shear stresses and torsional stresses resulting from the weight of an electrical fixture, such as the outlet box 11, supported by the hanger bar 10.

It will also be noted that once the hanger bar 10 is installed, even if the swaged interconnections of the invention between the bar members 12 and 14 and the mounting members 16 and 18, respectively, are not completely tight initially, or become slightly loose, the strengths of these interconnections are not significantly impaired because of the telescopic relations between the bar members and the connector tabs on the mounting members, which is an important feature.

The outlet box 11, or the like, is mounted on the hanger bar 10 by a mounting device 40 of the invention which is shown in FIGS. 1, 5 and 6 of the drawings and which will now be described with reference thereto. The mounting device 40, considered generally, includes a box locator 42 engageable with the hanger bar 10, a clamping clip 44 engageable with the inner surface of the box 11 adjacent an opening 46 (which may be formed by removal of a knockout disc), and a clamping screw 48 extending through the clamping clip 44 and threaded into the box locator 42 to clamp the box between the clip 44 and the hanger bar 10 and within the opening 46 in the box 11, and two spaced, parallel arms 52 extending through a longitudinal slot 54 formed by the laterally spaced, inturned flanges of the bar members 12 and 14 forming the hanger bar. The arms 52 of the box locator 42 are provided in their edges with notches 56 which receive the inturned flanges of the bar members 12 and 14 therein, and which provide shoulders 58 engageable with the inner surfaces of the inturned flanges on the inner bar member 14. As will be apparent, the box locator 42 may be assembled with the hanger bar 10 by first inserting the ends of the arms 52 longitudinally into the outer bar member 12, and then inserting the inner bar member 14 longitudinally into the outer, in such a manner that the inturned flanges of both bar members are received in the notches 56 in the arms 52, as shown in FIG. 5 of the drawings.

The clamping clip 44, which is also generally U-shaped, is oriented crosswise of the box locator 42 in straddling relation therewith, as best shown in FIG. 5 of the drawings. The clamping clip 44 has a base 60 and two spaced, parallel arms 62 having end surfaces 64 which are engageable with the inner surface of the box 11, as best shown in FIG. 1 of the drawings, adjacent the opening 46 therein. The arms 62 terminate in central tabs 66 which project beyond the end surfaces 64 into and through the opening 46 into straddling relation with the side walls of the hanger bar 10, as best shown in FIG. 5. The tabs 66 thus serve to positively locate the clamping clip 44 relative to the box 11, and to locate the box properly relative to the hanger bar 10.

The clamping screw 48 extends through the base 60 of the clamping clip 44 and is threaded into the base 50 of the box locator 42. As will be apparent, upon tightening of the screw 48, the shoulders 48 on the arms 52 of the box locator 42 are drawn against the inner surfaces of the inturned flanges of the inner bar member of the hanger bar 10, and the end surfaces 64 of the arms 62 of the clamping clip 44 are drawn against the inner surface of the box 11. This rigidly clamps the box 11 to the hanger bar and clamps the two bar members of the hanger bar together.

In FIGS. 7 and 8 of the drawings is shown a mounting device 140 of the invention which includes the same box locator 42 as the mounting device 40, but which includes a different clamping clip 144 and clamping screw 148. In this case, the clamping clip 144 includes a shell-like base 160 which is externally threaded to form a stud. Extending from the base or stud 160 are arms 162 having end surfaces 164 and tabs 166 respectively corresponding to the end surfaces 64 and the tabs 66. The tabs 166 differ from the tabs 66 in that they are only long enough to extend into an opening such as the opening 46 and not through it into straddling engagement with a hanger bar. Thus, the tabs 166 serve merely to locate the clamping clip 144 relative to an outlet box opening, but not relative to a hanger bar.

In FIGS. 9 and 10 of the drawings are shown a hanger bar member 212 and a mounting member 216 respectively similar to the hanger bar member 12 and the mounting member 16, and secured together by swaged indentations 234 similar to the swaged indentations 34. The mounting member 216 is adapted to be nailed to a stud, joist, or the like, by a nail 236 driven part way through a dimple 238 which is split into four prongs 240, the nail being frictionally held in place by these prongs until such time as it is driven into the desired support. With this construction, the mounting member 16 may be attached to the desired support merely by hitting the nail 236 with a hammer, which is an important feature.

Although exemplary embodiments of the invention have been disclosed herein for purposes of illustration, it will be understood that various changes, modifications and substitutions may be incorporated in such embodiments without departing from the spirit of the invention as defined by the claims which follow.

I claim:

1. In a support for an electrical outlet box, or the like, the combination of:
   (a) a generally channel-shaped hanger bar having laterally spaced side walls, an integral connecting wall joining said side walls, and laterally spaced, inturned flanges integral with and projecting inwardly from said side walls and spaced from said connecting wall;
   (b) a mounting member having two laterally spaced connector tabs inserted longitudinally into one end of hanger bar respectively adjacent said side walls and respectively between said inturned flanges and said connecting wall, said connector tabs extending transversely from said connecting wall to said inturned flanges, respectively;
   (c) portions of said inturned flanges being swaged into the adjacent edges of said connector tabs;
   (d) a U-shaped box locator having a base externally of said hanger bar and arms extending into said hanger bar through the space between said inturned flanges;
   (e) said arms of said box locator having shoulders respectively engageable with the inner surfaces of said inturned flanges;
   (f) a generally U-shaped clamping clip straddling said hanger bar and said box locator;
   (g) said clamping clip having a base and having arms provided with end surfaces engageable in clamping relation with an inner surface of an outlet box adjacent an opening therein to clamp said box against said hanger bar; and
   (h) a screw extending through said base of said clamping clip and threaded into said base of said box locator.

2. In a support for an electrical outlet box, or the like, the combination of:
   (a) a generally channel-shaped hanger bar having laterally spaced side walls, an integral connecting wall joining said side walls, and laterally spaced, inturned flanges integral with and projectingly inwardly from said side walls and spaced from said connecting wall;
   (b) a U-shaped box locator having a base externally of said hanger bar and arms extending into said hanger bar through the space between said inturned flanges;
   (c) said arms of said box locator having shoulders respectively engageable with the inner surfaces of said inturned flanges;
   (d) a generally U-shaped clamping clip straddling said hanger bar and said box locator;
   (e) said clamping clip having a base and having arms provided with end surfaces engageable in clamping relation with an inner surface of an outlet box adjacent an opening therein to clamp said box against said hanger bar; and
   (f) a screw extending through said base of said clamping clip and threaded into said base of said box locator.

3. In a support for an electrical outlet box, or the like, the combination of:
   (a) a generally channel-shaped hanger bar having laterally spaced side walls, an integral connecting wall joining said side walls, and laterally spaced, inturned flanges integral with and projecting inwardly from said side walls and spaced from said connecting wall;
   (b) a U-shaped box locator having a base externally of said hanger bar and arms extending into said hanger bar through the space between said inturned flanges;
   (c) said arms of said box locator having shoulders respectively engageable with the inner surfaces of said inturned flanges;
   (d) a generally U-shaped clamping clip straddling said hanger bar and said box locator;
   (e) said clamping clip having a base and having arms provided with end surfaces engageable in clamping relation with an inner surface of an outlet box adjacent an opening therein to clamp said box against said hanger bar;
   (f) said arms of said clamping clip terminating in central tabs insertable into the opening in the outlet box; and
   (g) a screw extending through said base of said clamping clip and threaded into said base of said box locator.

4. In a device for mounting an outlet box, or the like, having an opening therein, on a generally channel-shaped hanger bar having side walls terminating in laterally spaced, inturned flanges defining a longitudinal slot therebetween, the combination of:
   (a) a U-shaped box locator having a base and arms adapted to extend through said slot into said hanger bar;
   (b) said arms of said box locator having in their edges notches to receive said inturned flanges;
   (c) a generally U-shaped clamping clip oriented crosswise of and straddling said box locator and having a base and arms;
   (d) said arms of said clamping clip having end surfaces engageable with said box adjacent said opening to clamp said box against said hanger bar; and
   (e) a screw extending through said base of said clamping clip and threaded into said base of said box locator.

5. In a device for mounting an outlet box, or the like, having an opening therein, on a generally channel-shaped hanger bar having side walls terminating in laterally spaced, inturned flanges defining a longitudinal slot therebetween, the combination of:
   (a) a U-shaped box locator having a base and arms adapted to extend through said slot into said hanger bar;
   (b) said arms of said box locator having in their edges notches to receive said inturned flanges;
   (c) a generally U-shaped clamping clip oriented crosswise of and straddling said box locator and having a base and arms;
(d) said arms of said clamping clip having end surfaces engageable with said box adjacent said opening to clamp said box against said hanger bar;
(e) a screw extending through said base of said clamping clip and threaded into said base of said box locator; and
(f) said arms of said clamping clip terminating in central tabs insertable into and engageable with the edge of said opening in said box.

6. In a device for mounting an outlet box, or the like, having an opening therein, on a generally channel-shaped hanger bar having side walls terminating in laterally spaced, inturned flanges defining a longitudinal slot therebetween, the combination of:
(a) a U-shaped box locator having a base and arms adapted to extend through said slot into said hanger bar;
(b) said arms of said box locator having in their edges notches to receive said inturned flanges;
(c) a generally U-shaped clamping clip oriented crosswise of and straddling said box locator and having a base and arms;
(d) said arms of said clamping clip having end surfaces engageable with said box adjacent said opening to clamp said box against said hanger bar;
(e) a screw extending through said base of said clamping clip and threaded into said base of said box locator;
(f) said arms of said clamping clip terminating in central tabs insertable into and engageable with the edge of said opening in said box; and
(g) said tabs being of sufficient length to engage the outer surfaces of said side walls of said hanger bar.

References Cited by the Examiner
UNITED STATES PATENTS

| | | | |
|---|---|---|---|
| 1,156,076 | 10/15 | Henry | 248—262 |
| 2,729,414 | 1/56 | Clark | 248—57 |
| 2,816,726 | 12/57 | White | 248—57 |
| 2,945,661 | 7/60 | Appleton | 248—205 |

CLAUDE A. LE ROY, *Primary Examiner.*